United States Patent
Wu et al.

(10) Patent No.: US 10,434,877 B2
(45) Date of Patent: Oct. 8, 2019

(54) DRIVER-ASSISTANCE METHOD AND A DRIVER-ASSISTANCE APPARATUS

(71) Applicant: VIA Technologies, Inc., New Taipei (TW)

(72) Inventors: Min-Chang Wu, New Taipei (TW); Kuan-Ting Lin, New Taipei (TW)

(73) Assignee: VIA Technologies, Inc., New Taipei (TW)

( * ) Notice: Subject to any disclaimer, the term of this patent is extended or adjusted under 35 U.S.C. 154(b) by 47 days.

(21) Appl. No.: 15/494,564

(22) Filed: Apr. 24, 2017

(65) Prior Publication Data
US 2017/0324943 A1 Nov. 9, 2017

Related U.S. Application Data

(63) Continuation-in-part of application No. 15/213,410, filed on Jul. 19, 2016, now Pat. No. 9,992,481.

(30) Foreign Application Priority Data

May 5, 2016 (TW) .............................. 105113922 A
Jan. 23, 2017 (TW) .............................. 106102348 A

(51) Int. Cl.
*B60K 35/00* (2006.01)
*H04N 7/18* (2006.01)
(Continued)

(52) U.S. Cl.
CPC ................ *B60K 35/00* (2013.01); *B60R 1/00* (2013.01); *G06T 3/4038* (2013.01); *G06T 11/60* (2013.01);
(Continued)

(58) Field of Classification Search
CPC ............ B60K 35/00; B60K 2350/1088; B60K 2350/2013; B60K 2350/2017;
(Continued)

(56) References Cited

U.S. PATENT DOCUMENTS

2010/0245577 A1* 9/2010 Yamamoto ................ B60R 1/00 348/148
2013/0063601 A1* 3/2013 Wakabayashi ............ B60R 1/00 348/148
(Continued)

FOREIGN PATENT DOCUMENTS

CN 102745138 12/2014
TW 201418076 5/2014

OTHER PUBLICATIONS

"Office Action of Taiwan Counterpart Application," dated Apr. 26, 2017, p. 1-p. 5, in which the listed references were cited.

*Primary Examiner* — Ayman A Abaza

(74) *Attorney, Agent, or Firm* — JCIPRNET

(57) ABSTRACT

A driver-assistance method and a driver-assistance apparatus are provided. In the method, a movement trajectory of wheels in surroundings of a vehicle when the vehicle moves are calculated. Multiple cameras disposed on the vehicle are used to capture images of multiple perspective views surrounding the vehicle, and the images of the perspective views are transformed into images of a top view. A synthetic image surrounding the vehicle is generated according to the images of the perspective views and the top view. Finally, the synthetic image and the movement trajectories are mapped and combined to a 3D model surrounding the vehicle and a movement image including the movement trajectories having a viewing angle from an upper rear side to a lower front side of the vehicle is provided by using the 3D model when backing up the vehicle.

18 Claims, 12 Drawing Sheets

(51) Int. Cl.
  *G06T 11/60* (2006.01)
  *H04N 5/232* (2006.01)
  *B60R 1/00* (2006.01)
  *G06T 3/40* (2006.01)
  *G06T 15/20* (2011.01)
  *H04N 5/262* (2006.01)

(52) U.S. Cl.
  CPC ....... *G06T 15/205* (2013.01); *H04N 5/23238* (2013.01); *H04N 5/2628* (2013.01); *H04N 7/181* (2013.01); *B60K 2370/1531* (2019.05); *B60K 2370/173* (2019.05); *B60K 2370/176* (2019.05); *B60K 2370/21* (2019.05); *B60R 2300/607* (2013.01)

(58) Field of Classification Search
  CPC ... B60K 2350/607; B60R 1/00; G06T 3/4038; G06T 11/60; G06T 15/205; H04N 5/23238; H04N 5/2628; H04N 7/181
  USPC .......................................................... 348/48
  See application file for complete search history.

(56) References Cited

U.S. PATENT DOCUMENTS

| | | | |
|---|---|---|---|
| 2013/0141547 A1* | 6/2013 | Shimizu | G06T 3/0062 348/48 |
| 2014/0132527 A1* | 5/2014 | Wu | G06F 3/04883 345/173 |
| 2015/0009329 A1* | 1/2015 | Ishimoto | B60R 1/00 348/148 |

* cited by examiner

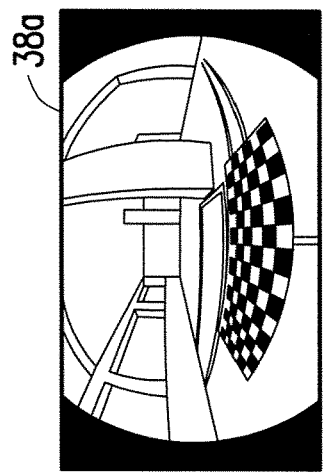
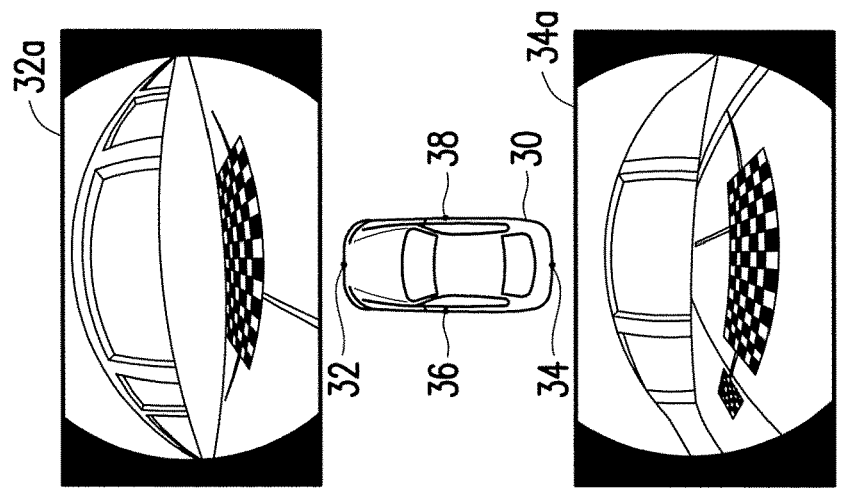
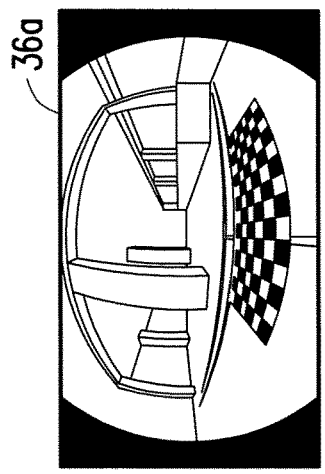
FIG. 3

DRIVER-ASSISTANCE METHOD AND A DRIVER-ASSISTANCE APPARATUS

CROSS-REFERENCE TO RELATED APPLICATION

This application is a continuation-in-part application of and claims the priority benefit of U.S. application Ser. No. 15/213,410, filed on Jul. 19, 2016, now pending. The prior U.S. application Ser. No. 15/213,410 claims the priority benefit of Taiwan application serial no. 105113922, filed on May 5, 2016. This application also claims the priority benefit of Taiwan application serial no. 106102348, filed on Jan. 23, 2017. The entirety of each of the above-mentioned patent applications is hereby incorporated by reference herein and made a part of specification.

BACKGROUND

Field of the Invention

The invention is related to a method and an apparatus for processing images, and more particularly, to a driver-assistance method and a driver-assistance apparatus.

Description of Related Art

The modern backing viewing system (also known as reversing camera system) captures the image (including the floor (i.e., the ground) and the scenes) behind a vehicle by using the camera disposed on the rear of the vehicle, and estimates a movement trajectory of the rear wheel of the vehicle according to the rotation angle of the steering wheel when backing the vehicle, so as to depict the movement trajectory in the captured image. By displaying a rear image including the movement trajectory of the rear wheel viewed from front to back when backing up the vehicle, it may assist the driver to confirm that whether the current rotation angle of the steering wheel is proper or needs to be adjusted. As a result, the vehicle may be backed to a place for parking accurately.

Nevertheless, due to the limited view of cameras, the conventional backing viewing system viewing from front to back displays the image with limited view even if the image is captured by a wide-angle lens or a fisheye lens having a wider view, and the scenes or other objects surrounding the vehicle may not totally or clearly displayed. Therefore, when backing up the vehicle based on the backing trajectory displayed by the conventional backing viewing system viewing from front to back, the user still has to beware the surrounding scenes or objects when entering the backing region.

SUMMARY

The invention provides a driver-assistance method and an apparatus using the same. By calculating a movement trajectory of a vehicle and plotting the movement trajectory in an image with a viewing angle from an upper rear side to a lower front side of the vehicle, the driver may be assisted to be aware of the relations between the route of the vehicle and the surrounding floor and scenes.

The driver-assistance method of the invention is adapted to an electronic apparatus disposed on a vehicle. The electronic apparatus is coupled to a plurality of cameras disposed on the vehicle. In the method, a movement trajectory of wheels in the surroundings of a vehicle during the movement of the vehicle is calculated. Then, a plurality of images of a plurality of perspective views surrounding the vehicle are captured by using the cameras, and a view of the images are transformed from the perspective view to a top view. After that, a synthetic image surrounding the vehicle is generated according to the images of the perspective views and the top view. Finally, the synthetic image and the movement trajectory are mapped and combined to a 3D model surrounding the vehicle, and a movement image including the movement trajectory having a viewing angle from an upper rear side to a lower front side of the vehicle is provided by using the 3D model when backing up the vehicle.

The driver-assistance apparatus of the invention includes a connection device, a storage device and a processor. In which, the connection device is configured to couple with a plurality of cameras disposed on a vehicle. The storage device is configured to store a plurality of modules. The processor is coupled to the connection device and the storage device, and configured to load and execute the modules stored in the storage device. The modules include a trajectory calculation module, an image capturing module, a view transformation module, an image stitching module and a 3D modeling module. In which, the trajectory calculation module is configured to calculate a movement trajectory of a plurality of wheels in surroundings of the vehicle when the vehicle moves. The image capturing module captures a plurality of images of a plurality of perspective views surrounding the vehicle by using the cameras. The view transformation module is configured to transform an image of the perspective view to an image of a top view. The image stitching module is configured to generate a synthetic image surrounding the vehicle according to the images of the perspective views and the top view. The 3D modeling module is configured to map and combine the synthetic image and the movement trajectory to a 3D model surrounding the vehicle, and provide a movement image including the movement trajectory and having a viewing angle from an upper rear side to a lower front side of the vehicle by using the 3D model when backing up the vehicle.

Based on the above, the driver-assistance method and the driver-assistance apparatus according to the invention calculate a movement trajectory of the wheels in surroundings of the vehicle when the vehicle moves, and combine the movement trajectory and a panoramic image of the vehicle to a 3D model, then provide a movement image including the movement trajectory with a viewing angle from an upper rear side to a lower front side of the vehicle by using the 3D model when backing up the vehicle. Accordingly, a user may be assisted to see the changes of movement trajectories and scenes or objects surrounding the vehicle clearly when driving, so that the driving operation may be adjusted correspondingly.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the present invention.

FIG. 3 illustrates an example of capturing images surrounding a vehicle according to an embodiment of the invention.

DESCRIPTION OF THE EMBODIMENTS

The invention calculates a movement trajectory of a vehicle according to a rotation angle of a steering wheel, and applies the movement trajectory in a panoramic image constructed by a vehicle surround-view system. In which, the invention either transforms the movement trajectory, merges the transformed movement trajectory into the panoramic image, and maps the panoramic image to a 3D model of the surroundings of the vehicle, or, directly maps the movement trajectory and the panoramic image to the 3D model together. Finally, the invention provides a movement image including the movement trajectory of a viewing angle from an upper rear side to a lower front side by using the 3D model when backing up the vehicle (the front side and rear side mentioned in the invention correspond to the anterior part and the posterior part of the vehicle, respectively). Accordingly, a user may be assisted to see the positions or changes of the scenes surrounding the vehicle clearly when driving, so that the driving operation may be adjusted correspondingly.

Figure 1:
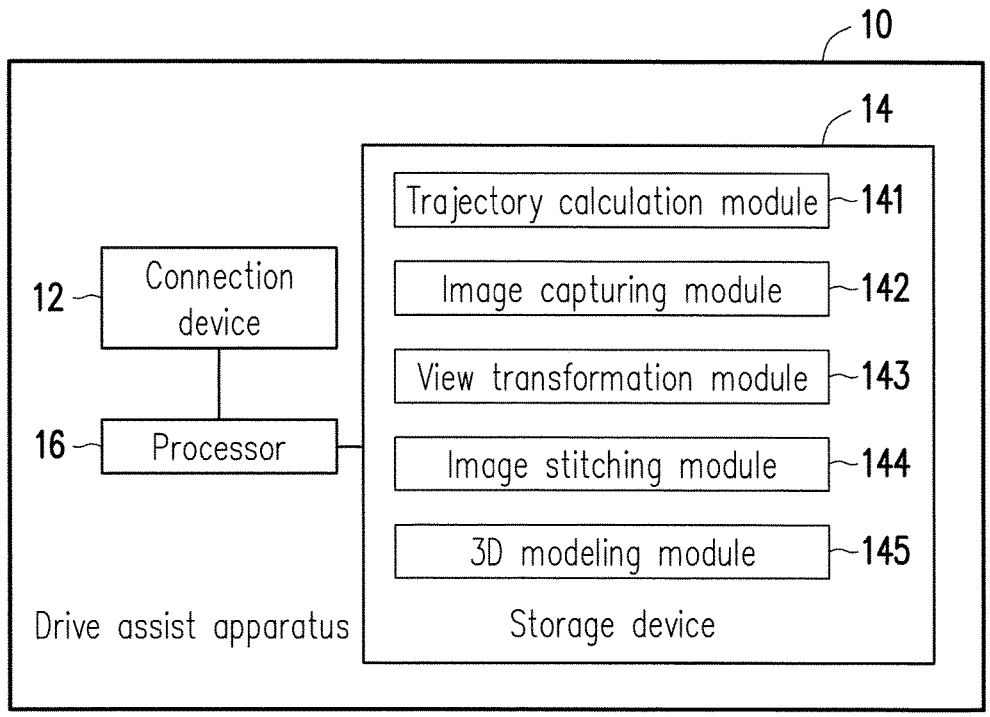
FIG. 1 illustrates a block diagram of a driver-assistance apparatus according to an embodiment of the invention.

FIG. 1 illustrates a block diagram of a driver-assistance apparatus according to an embodiment of the invention. A driver-assistance apparatus 10 of the present embodiment is, for example, an automotive computer, or a cell phone, a tablet, a personal computer, or other apparatuses with calculation capabilities, and includes a connection device 12, a storage device 14, and a processor 16, and the functions thereof are respectively described in the following.

The connection device 12 is, for example, a wired or wireless communication interface such as a universal serial bus (USB), RS232, Bluetooth, or wireless fidelity (Wi-Fi), which is configured to couple with at least one camera disposed on a vehicle, and to receive at least one image captured by the camera.

The storage device 14 may be any type of fixed or removable random access memory (RAM), read-only memory (ROM), flash memory, or the similar devices or the combination of said devices. In the present embodiment, the storage device 14 is configured to store a trajectory calculation module 141, an image capturing module 142, a view transformation module 143, an image stitching module 144, and a 3D modeling module 145.

The processor 16 is, for example, a central processing unit (CPU), or other general-purpose or specific-purpose programmable microprocessor, digital signal processor (DSP), programmable controller, application specific integrated circuits (ASIC), programmable logic device (PLD), or other similar devices or the combination of the said devices. The processor 16 is coupled to the connection device 12 and the storage device 14.

In the present embodiment, the modules stored in the storage device 14 are, for example, computer programs and may be loaded by the processor 16 so as to perform the driver-assistance method of the present embodiment. Detailed steps of the method are described in the following embodiments.

Figure 2:
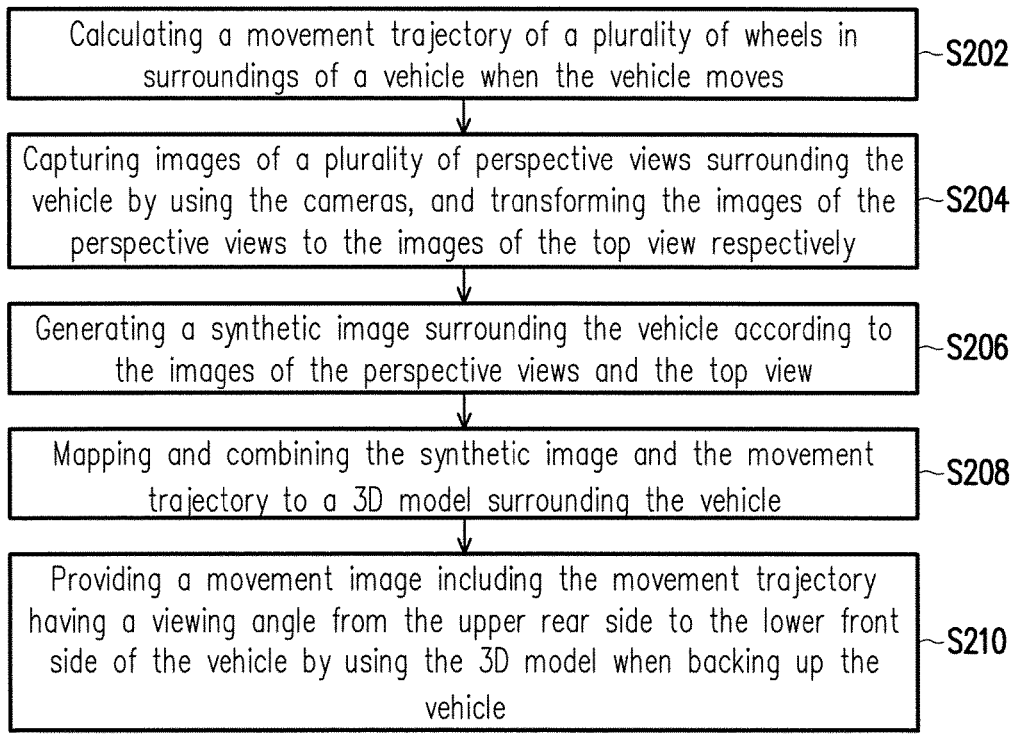
FIG. 2 illustrates a flowchart of a driver-assistance method according to an embodiment of the invention.

FIG. 2 illustrates a flowchart of a driver-assistance method according to an embodiment of the invention. Please refer to FIG. 1 and FIG. 2, the method of the present embodiment is adapted to the driver-assistance apparatus 10 of FIG. 1. Detailed steps of the driver-assistance method of the present embodiment are described in the following accompanied with the elements of the driver-assistance apparatus 10.

First, the trajectory calculation module 141 is executed by the processor 16, to calculate a movement trajectory of a plurality of wheels in surroundings of a vehicle when the vehicle moves (S202). In detail, the trajectory calculation module 141 may detect a rotation angle of a steering wheel of the vehicle by, for example, using an angle sensor and looking up a correspondence table of the rotation angle of the steering wheel and a steering angle of the wheels, so as to find the steering angle of the wheels corresponding to the rotation angle of the steering wheel, and to estimate a movement trajectory of the vehicle according to the steering angle and a wheel configuration of the vehicle. The correspondence table of the rotation angle of the steering wheel and a steering angle of the wheels is, for example, previously established by the trajectory calculation module 141 and stored in the storage device 14, for the convenience of being looked up when calculating the movement trajectory.

For example, a left wheel trajectory $(x_{rL}, y_{rL})$ and a right wheel trajectory $(x_{rR}, y_{rR})$ when backing up the vehicle may be calculated by the following formulas:

$$\text{left wheel:} \begin{cases} x_{rL} = \left(l \cdot \cot\phi - \frac{w}{2}\right) \cdot \sin\left(\frac{v \cdot \sin\phi}{l} t\right) \\ y_{rL} = -\left(l \cdot \cot\phi - \frac{w}{2}\right) \cdot \cos\left(\frac{v \cdot \sin\phi}{l} t\right) + l \cdot \cot\phi \end{cases} ;$$

$$\text{right wheel:} \begin{cases} x_{xR} = \left(l \cdot \cot\phi + \frac{w}{2}\right) \cdot \sin\left(\frac{v \cdot \sin\phi}{l} t\right) \\ y_{rR} = -\left(l \cdot \cot\phi + \frac{w}{2}\right) \cdot \cos\left(\frac{v \cdot \sin\phi}{l} t\right) + l \cdot \cot\phi \end{cases} .$$

In which, l is a wheelbase, w is a rear track, v is a speed of a center point of a front axle (i.e., speed of the vehicle), t is a moving time, and φ is a rotation angle of the center point of the front axle. The rotation angle of the center point of the front axle is mainly deduced by a steering angle of both the left and right front wheels. The steering angle of the left and right front wheels is related to the rotation angle of the steering wheel. Regarding the correspondence relationship, the rotation angle of the steering wheel may be detected by using an angle sensor disposed on the steering wheel, and the steering angle of the left and right front wheels corresponding to the rotation angle of the steering wheel may be detected by using a wheel aligner. By repeating said steps, the steering angles of the left and right front wheels corresponding to different rotation angles of the steering wheel may be detected and recorded by turning the steering wheel incrementally, so that the correspondence table of the rotation angle of the steering wheel and the steering angle of the wheels may be established.

Then, the image capturing module 142 is executed by the processor 16, to capture a plurality of images of a plurality of perspective views by using the cameras coupled to the connection device 12 (S204). Said cameras may include four cameras disposed in front, rear, left, and right positions on the vehicle, for capturing the images of perspective views of front, rear, left, and right sides of the vehicle, but the invention is not limited thereto. People having ordinary skills in the art may additionally dispose cameras in other positions on the vehicle according to actual requirements, so as to increase the coverage of the captured images.

For example, FIG. 3 illustrates an example of capturing the images surrounding a vehicle according to an embodiment of the invention. Please refer to FIG. 3, four cameras 32, 34, 36, 38 are respectively disposed in four positions of front, rear, left, and right of the vehicle 30. The cameras 32, 34, 36, 38 are respectively configured to capture the images 32a, 34a, 36a and 38a of perspective views of front, rear, left, and right of the vehicle.

It is noted that, in said embodiment, the cameras disposed on the vehicle may adopt a fisheye lens with a viewing angle approximating 180 degrees, and are capable of capturing images with a wider coverage. Since the images captured by the fisheye lens may be deformed (e.g., circular distortion as shown in images 32a, 34a, 36a, 38a), a fisheye calibration module (not shown) may be executed by the processor 16 in the embodiment of the invention, so as to perform a fisheye calibration on the images.

The fisheye calibration module may crop or/and calibrate the images captured by the cameras according to extrinsic parameters (e.g., translation and rotation of the camera) and intrinsic parameters (e.g., focal length, center point, center resolution, edge resolution, distortion parameter, etc.) of each camera, so as to move the center of the fisheye lens to an image center. In detail, a scene captured by the fisheye lens merely appears in a circular area around the image center and is surrounded by black rims. If the left and right black rims have different widths, it indicates that the center of the lens is deviated from the image center. In this case, the fisheye calibration module may, for example, crop the image, so that the black rims on both sides of the image are consistent, so as to move the center of the fisheye lens to the image center, and to ensure that the image may be restored to its original shape when the fisheye calibration is subsequently performed. In other embodiments, if the cameras disposed on the vehicle are not fisheye lenses, the fisheye calibration may not be performed, or other calibration types corresponding to the lenses of the cameras may be performed.

After calibrating the image center, the fisheye calibration module may further perform the fisheye calibration on the images captured by the cameras according to said parameters of each camera, to outwardly calibrate the image from the image center, so that the distorted image may be restored to the original shape of the captured scene.

In detail, in a first embodiment of the fisheye calibration module, it is assumed that a width of a captured fisheye image is dw, a height thereof is dh, a width of an original image after calibration is sw, a height thereof is sh. It is assumed that (dx,dy) is a pixel position of the fisheye image before calibration, and (sx,sy) is a pixel position of a source image after calibration. It is also assumed that a de-fish parameter of the fisheye lens is f. In which, the relationship of distance (rx, ry) between the pixel (dx,dy) and the image center (dw/2,dh/2) is:

$$(rx, ry) = \left(dx - \frac{dw}{2}, dy - \frac{dh}{2}\right).$$

The pixel position (sx,sy) of the source image after calibration (i.e., de-fisheye image) is:

$$(sx, sy) = \left(\frac{sw}{2} + \theta \times rx, \frac{sh}{2} + \theta \times ry\right);$$

where $$\theta = \begin{cases} 1, & \text{if } r = 0 \\ \frac{\tan^{-1} r}{r}, & \text{if } r \neq 0 \end{cases}, \text{ where } r = \frac{d(rx, ry)}{d(sw, sh)/f},$$

and where d(i,j) is the Euclidean distance.

Figure 4:
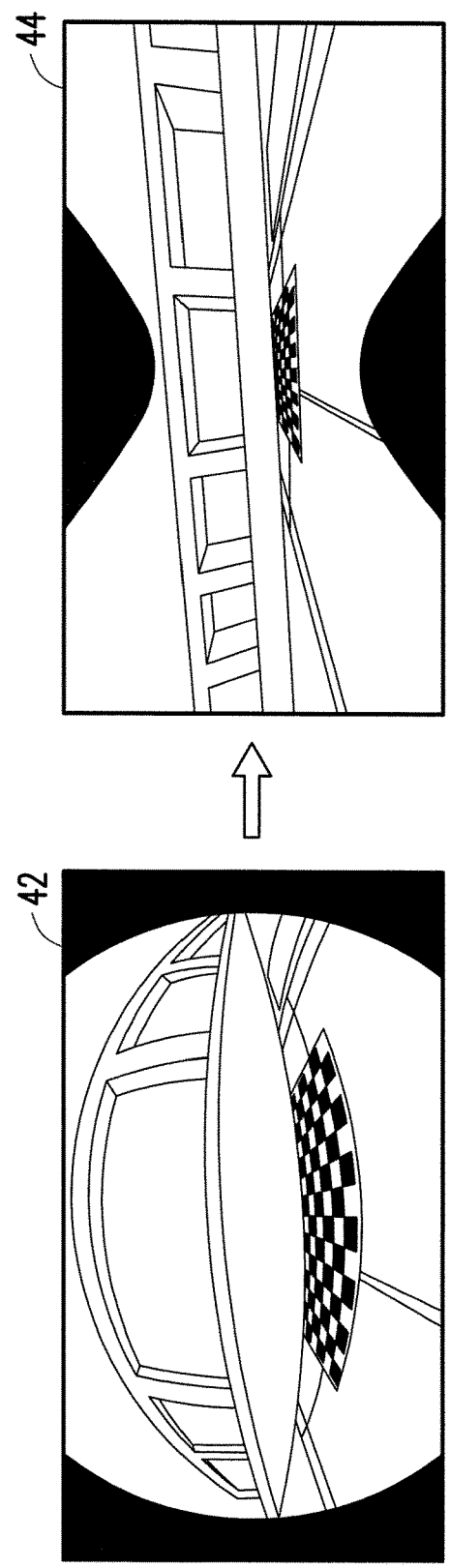
FIG. 4 illustrates an example of fisheye calibration according to an embodiment of the invention.

For example, FIG. 4 illustrates an example of a fisheye calibration according to an embodiment of the invention. Please refer to FIG. 4, the fisheye calibration is performed on a fisheye image 42 captured by the camera disposed on the front of the vehicle using the fisheye lens. Positions of the pixels in the fisheye image 42 may be transformed into corresponding positions in a de-fisheye image 44 through the said formulas, so as to obtain the de-fisheye image 44 without distortion. In which, due to the limitations of the fisheye lens, black rims may appear in the upper middle and the lower middle of the de-fisheye image 44.

In a second embodiment of the fisheye calibration module, a correspondence relationship of positions of the source image in the 3D real world (X,Y,Z) and pixel positions in a target image (u,v) is as follows:

$$\begin{bmatrix} x \\ y \\ z \end{bmatrix} = R \begin{bmatrix} X \\ Y \\ Z \end{bmatrix} + t;$$

$$x' = \frac{x}{z}, y' = \frac{y}{z}, r = \sqrt{x'^2 + y'^2}, \theta = \tan^{-1} r;$$

$$\theta_d = k_1 \theta + k_2 \theta^3 + k_3 \theta^5 + k_4 \theta^7 + k_5 \theta^9;$$

$$u = x' \times \frac{\theta_d}{r} \times f_x + c_x, v = y' \times \frac{\theta_d}{r} \times f_y + c_y.$$

In which, R and t are the respective matrices representing translation and rotation of the extrinsic parameters, $k_1$ to $k_5$ are distortion parameters of the intrinsic parameters, $f_x$ and $f_y$ are focal lengths of the intrinsic parameters, $c_x$ and $c_y$ are positions of central point of the intrinsic parameters. The fisheye calibration module may solve said extrinsic parameters and intrinsic parameters according to a plurality of spatial positions taken from a calibration reference object of the source image and a plurality of pixel positions in the target image, so as to transform between the fisheye image and the de-fisheye image. In one embodiment, each of the cameras disposed in different positions on the vehicle may adopt the same or different intrinsic parameters and extrinsic parameters. In one embodiment, a mapping table of mapping the source image to the target image may be previously established according to the intrinsic parameters and the extrinsic parameters, and then the transformation between the fisheye image and the de-fisheye image may be performed by way of looking up the mapping table.

In step S204, the view transformation module 143 is further executed by the processor 16, to transform the images of the perspective views to the images of the top view respectively (S204). In which, the view transformation module 143 may transform positions of a plurality of pixels in the images of the perspective views to corresponding positions in the images of the top view by using a pre-built view transformation matrix.

Regarding said view transformation matrix, the view transformation module 143 may capture a first image of a perspective view including a reference object (e.g., a positioning grid or pattern drawn on the floor) by using said cameras, and capture a second image of a real top view including the same reference object by using another independent camera disposed above the reference object. Then, the view transformation module 143 may retrieve positions of a plurality of pixels of the reference object in the first image to serve as target positions, and retrieve positions of a plurality of corresponding pixels of the same reference object in the second image to serve as source positions, so as to solve a plurality of transformation coefficients in the view transformation matrix.

For example, assuming (xi,yj) is a pixel position in the source image (i.e., the second image of the top view), and (ui,vj) is a pixel position in the target image (i.e., the first image of the perspective view). Four predetermined pixels are obtained from the source image and four predetermined corresponding pixels are obtained from the target image for being substituted into the following equation:

$$\begin{bmatrix} x0 & y0 & 1 & 0 & 0 & 0 & -x0 \times u0 & -y0 \times u0 \\ x1 & y1 & 1 & 0 & 0 & 0 & -x1 \times u1 & -y1 \times u1 \\ x2 & y2 & 1 & 0 & 0 & 0 & -x2 \times u2 & -y2 \times u2 \\ x3 & y3 & 1 & 0 & 0 & 0 & -x3 \times u3 & -y3 \times u3 \\ 0 & 0 & 0 & x0 & y0 & 1 & -x0 \times v0 & -y0 \times v0 \\ 0 & 0 & 0 & x1 & y1 & 1 & -x1 \times v1 & -y1 \times v1 \\ 0 & 0 & 0 & x2 & y2 & 1 & -x2 \times v2 & -y2 \times v2 \\ 0 & 0 & 0 & x3 & y3 & 1 & -x3 \times v3 & -y3 \times v3 \end{bmatrix} \cdot \begin{bmatrix} C_{00} \\ C_{01} \\ C_{02} \\ C_{10} \\ C_{11} \\ C_{12} \\ C_{20} \\ C_{21} \end{bmatrix} = \begin{bmatrix} u0 \\ u1 \\ u2 \\ u3 \\ v0 \\ v1 \\ v2 \\ v3 \end{bmatrix}.$$

By solving the coefficients $C_{ij}$ (i, j=0~2, where $C_{22}$=1) in the above linear system, a corresponding 3×3 matrix C may be obtained. Therefore, the view transformation matrix for transforming the images of the perspective views to the images of the top view used in the present embodiment may be obtained by the inverse matrix of C. After obtaining the view transformation matrix for transforming the images of the perspective views to the images of the top view, the view transformation matrix may be multiplied by the corresponding vectors (ui,vi,1) of the pixels of the images of the perspective views captured by the cameras of the vehicle, to obtain the corresponding vectors (xi,yi,1) of the pixels of the images of the top view. Four pixels are used in the present embodiment for calculating the view transformation matrix, but in other embodiments, the view transformation matrix may be calculated by using other numbers of pixels. In one embodiment, each image captured by cameras disposed at different positions on the vehicle may be transformed by using the same or different view transformation matrices, so as to conform to the angle and lens parameters of each camera. In one embodiment, a mapping table for mapping each pixel of the images of the perspective views to each pixel of the images of the top view may be built in advance according to the view transformation matrix, and then the transformation may be carried out by looking up the mapping table. Back to FIG. 2, after obtaining the transformed image of the top view, the image stitching module 144 may generate a synthetic image surrounding the vehicle according to the images of the perspective views and the top view (S206). The image stitching module 144 may, for example, stitch a floor side image by using the images of the top view and stitch a wall side image by using the images of the perspective views, or stitch a synthetic image by using the images of the perspective views and the top view simultaneously.

In detail, the image stitching module 144 may, for example, find an interval comprised of at least a preset number of consecutive empty pixels from one column of pixels in each of the images of the top view after transformation, and divide each of the images of the perspective views and the top view into the floor side image and the wall side image according to a height of the interval in the image. Said column of pixels may be, for example, a column of pixels located on a middle line of the image, or a column of pixels located on a specific object in the image. Said preset number may be, for example, ten or other numbers set according to image parameters such as the resolution, which is not limited herein.

In detail, data of the pixels in the images of the perspective views are gathered in a lower portion of the image (i.e., floor side image) after being transformed into the top view, and decrease with the increase of the image height (i.e., the increase in the distance to the bottom of the image). Accordingly, a lot of empty pixels with no image data may be left in the images of the top view, and the empty pixels increase with the increase of the image height.

According to the characteristics, the present embodiment sets a preset number of the quantity for the distribution of the empty pixels. If a number of the consecutive empty pixels of the image of the top view in a vertical direction is greater than the preset number, it means that there are too many empty pixels above the interval in the image and thus the image is distorted. Accordingly, the image stitching module 144 may divide the images of the perspective views into the floor side images and the wall side images according to the height of the interval in each image, so as to preserve the clear floor side images. In which, the image stitching module 144 may, for example, determine the position of a division line by using a height of a middle point of the interval, or by using a height of pixels having the image data located on the top or the bottom of the interval.

Figure 5:
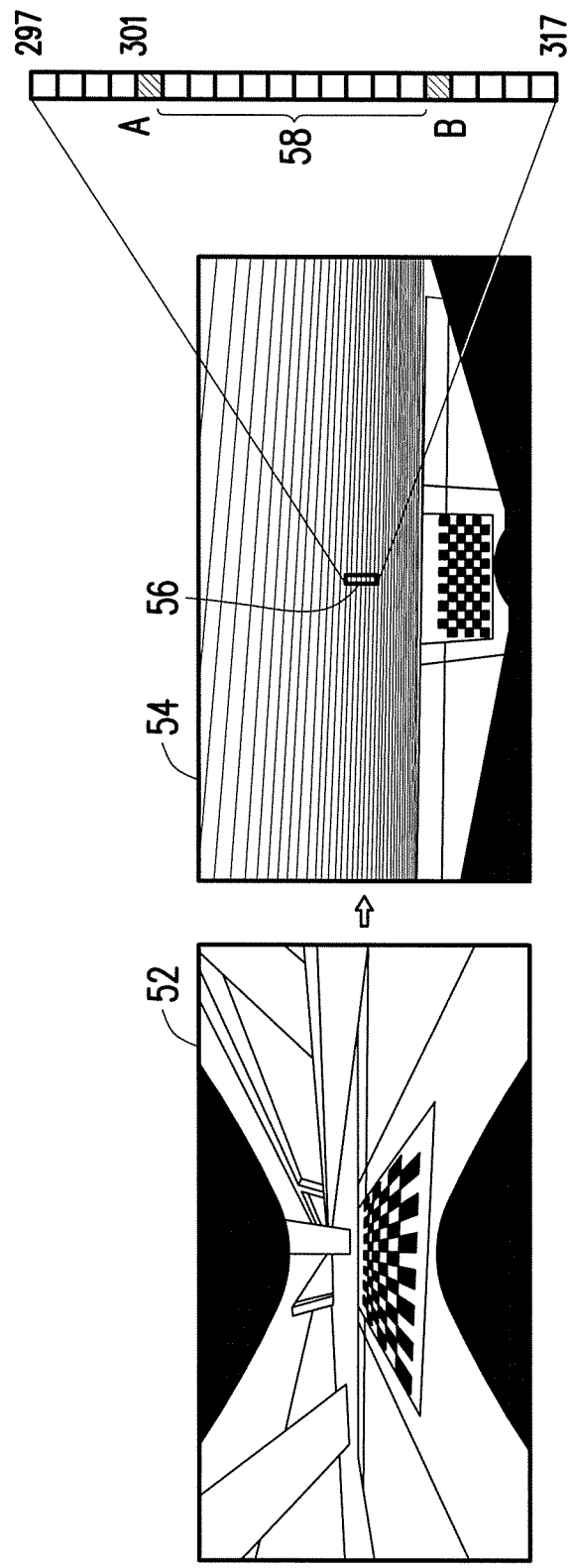
FIG. 5 illustrates an example of a method for processing images surrounding the vehicle according to an embodiment of the invention.

For example, FIG. 5 illustrates an example of a method for processing the images surrounding a vehicle according to an embodiment of the invention. Please refer to FIG. 5, an image 52 is a left side image of the vehicle after the fisheye calibration. By transforming a viewing angle of the image 52 to the top view, image 54 may be obtained. It should be known from the image 54 that the image data are mainly gathered in the floor side image. With the increase of the image height, the empty pixels (the region located at the upper portion of the image) are also increasing. Accordingly, the invention takes a column of pixels 56 of a line in the image 54 for deciding the position of the division line dividing the image 54. Please refer to the enlarged illustration of the column of pixels 56 on the right of the image 54, the column of pixels 56 includes multiple pixels with heights of 297 to 317, where the pixels A and B are pixels having the image data, and the other pixels are the empty pixels with no image data. Since the quantity of the empty pixels reaches ten, the position of the division line dividing the image 54 may be decided by using the interval 58 comprised of the empty pixels in the invention. In which, the height of the division line may be set by using the height of the middle point of the interval 58 in the image 54, or by using the height of the pixel A or B in the image 54 in the invention.

After the images of the perspective views and the top view are divided into the floor side images and the wall side images, the image stitching module 144 may stitch the floor side images and the wall side images to generate the synthetic image surrounding the vehicle. The image stitching module 144 may, for example, combine the floor side and the wall side images of the same view, and then stitch the combined images of adjacent views, and properly adjust the heights of the wall side images, so that the heights of the wall side images of the stitched images are consistent. Finally, the synthetic image surrounding the vehicle for 360 degrees may be generated.

Figure 6:
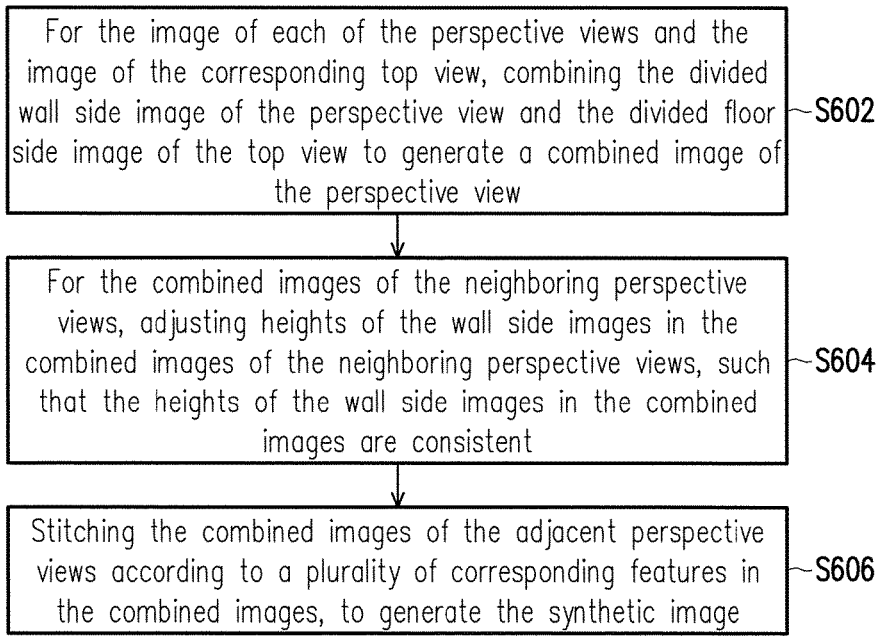
FIG. 6 illustrates a flowchart of a method for stitching images of different views to obtain a synthetic image surrounding the vehicle according to an embodiment of the invention.

In detail, FIG. 6 illustrates a flowchart of a method of stitching images of different views to obtain a synthetic image surrounding the vehicle according to an embodiment of the invention. Please refer to FIG. 1 and FIG. 6, the method of the present embodiment is adapted to the driver-assistance apparatus 10 of FIG. 1. Detailed steps of the driver-assistance method of the present embodiment are described in the following accompanied with the elements of the driver-assistance apparatus 10.

First, for the image of each of the perspective views and the image of the corresponding top view, the image stitching module 144 combines the divided wall side image of the perspective view and the divided floor side image of the top view, to generate a combined image of the perspective view (S602). Since the floor side image of the top view is clearer and close to a real image, and the wall side image of the perspective view is clearer and close to the real image, the floor side and the wall side images of the obtained combined image are both clear and close to the real image after the image stitching module 144 combines the floor side and the wall side images.

Figure 7:
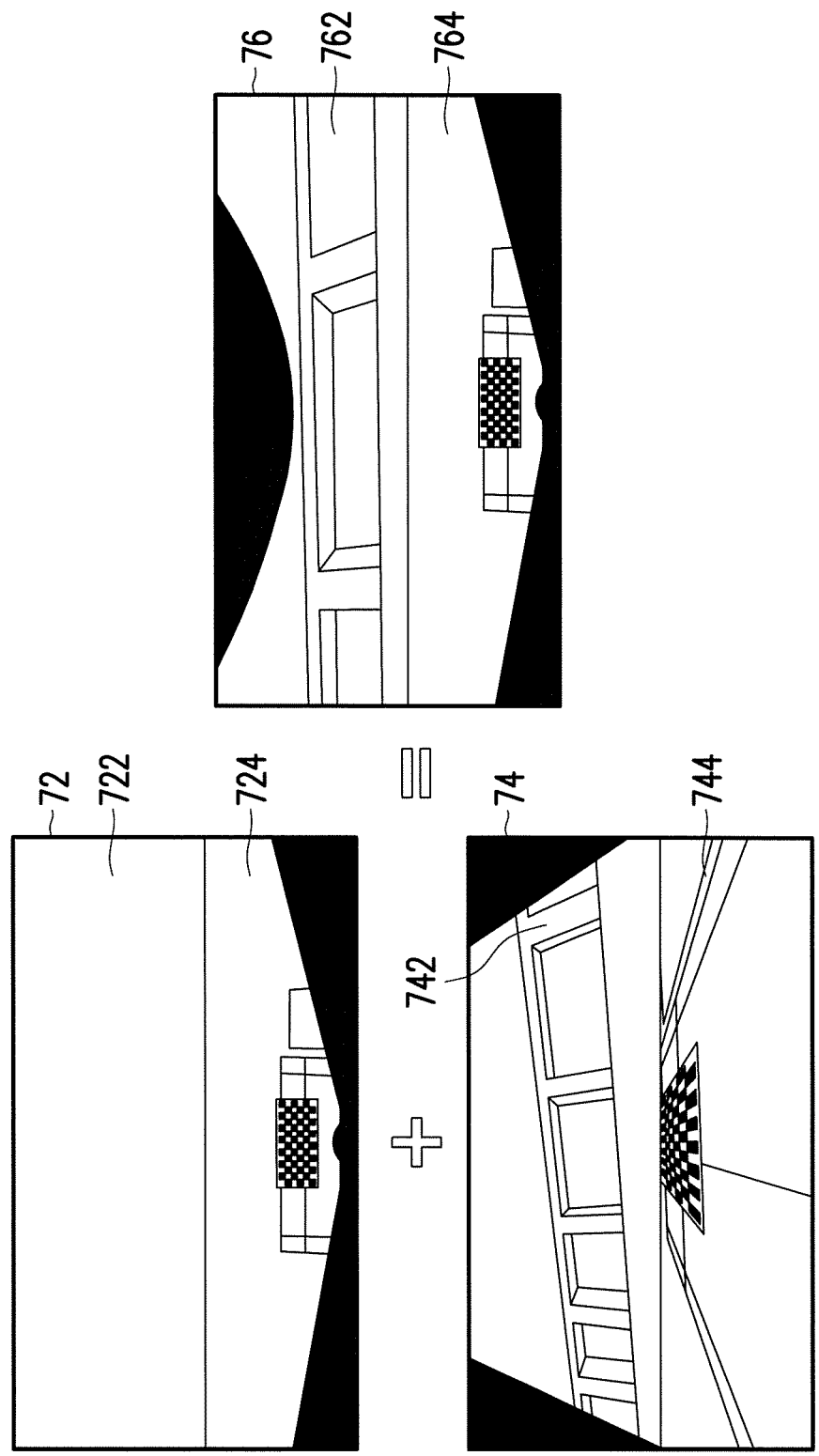
FIG. 7 illustrates an example of combining the wall side image of the perspective views and the floor side images of the top view according to an embodiment of the invention.

For example, FIG. 7 illustrates an example of combining a wall side image of the perspective view and the floor side image of the top view according to an embodiment of the invention. Please refer to FIG. 7, an image 74 is an image of the perspective view obtained after performing the fisheye calibration on the image captured by the camera disposed in the front of the vehicle, and image 72 is an image of the top view obtained by performing view transformation on the image 74. Based on the division line determining method of the aforementioned embodiment, the division lines for properly dividing the images 72 and 74 may be obtained. By using the division line, the image 72 of the top view may be divided into the wall side image 722 and the floor side image 724, and the image 74 of the perspective view may be divided into the wall side image 742 and the floor side image 744. Accordingly, the present embodiment combines the clearer floor side image 724 of the image 72 of the top view and the clearer wall side image 742 of the image 74 of the perspective view, to obtain the combined image 76. Further, when combining the floor side image 724 and the wall side image 742, the floor side image 724 and the wall side image 742 may be further resized according to the corresponding features (e.g., recognized by the conventional image recognition method) of the floor side image 724 and the wall side image 742, to obtain the floor side image 764 and the wall side image 762 have corresponding positions. The wall side image 762 in the present embodiment is obtained by resizing the wall side image 742.

It is noted that, the wall side image of the present embodiment is an image of the perspective view obtained after the fisheye calibration. However, even if the fisheye calibration is performed, the objects of the wall side image in the image of the perspective view are still possible of being deviated. The deviation becomes more obvious when the object is farther away from a middle line of the image. Accordingly, before the wall side image and the floor side image are combined in the present embodiment, the deviation adjustment may be performed on the wall side image, such that the objects in the adjusted wall side image are aligned.

Figure 8B:
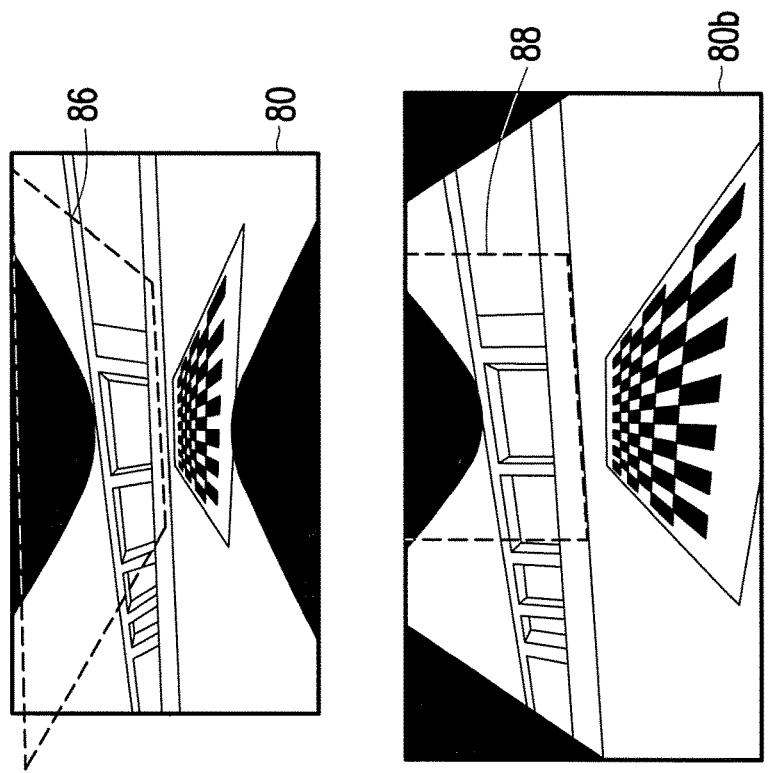
FIG. 8A and FIG. 8B illustrate an example of adjusting the wall side images according to an embodiment of the invention.
Figure 8A:
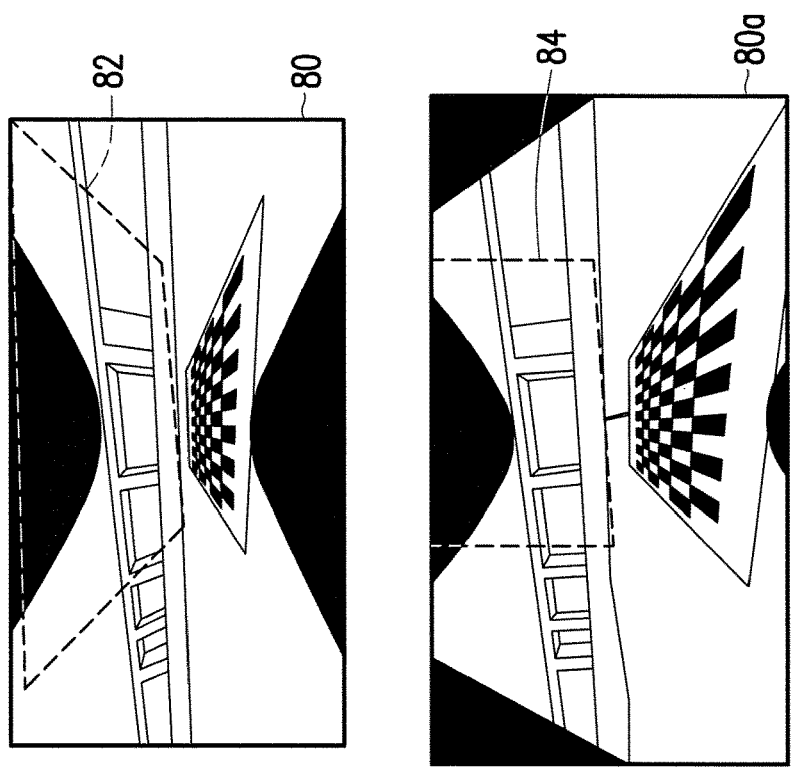

For example, FIG. 8A and FIG. 8B illustrate an example of adjusting the wall side image according to an embodiment of the invention. Please refer to FIG. 8A, an image 80 is an image of the perspective view obtained after performing the fisheye calibration on the image captured by the camera disposed in the front of the vehicle. In which, the present embodiment takes positions of a plurality of pixels located in the region 82 of the image 80 as source positions, and the region 82 is preset to be transformed into the region 84 to adjust the deviated objects in the region 82, so that the objects may be aligned after being transformed into the region 84.

It may be seen from pillars in the transformed image 80*a* that the pillars in the transformed image 80*a* are still leftward deviated. Accordingly, the present embodiment adjusts the region 82 from which pixels are taken to transform into the region 86. That is, the region of the taken pixels is expanded leftward, and the present embodiment presets the after-transformed region 88, where the size and shape of the region 88 are the same as those of the region 84. It may be seen from pillars in the transformed image 80*b*, the pillars are aligned with each other, and consistent with the axis (vertical direction) of the image. By using the aforementioned adjustment method, the problem of deviations of the objects in the wall side image of the image of the perspective view may be eliminated.

Back to FIG. 6, for the combined images of neighboring perspective views, the image stitching module 144 adjusts heights of the wall side images in the combined images, so that the heights of the wall side images in the combined images of the neighboring perspective views are consistent (S604). In detail, since the neighboring perspective views overlap, part of regions of the images of the neighboring perspective views overlap. However, heights of the overlapped regions may not be the same due to the differences of view directions. If the images of the neighboring perspective views are directly stitched with each other, the problem of height inconsistency may cause discontinuation within the stitched image. Accordingly, the present embodiment compares the corresponding features of the combined images of the neighboring perspective views, to adjust the heights of the combined images to be consistent with each other.

Figure 9:
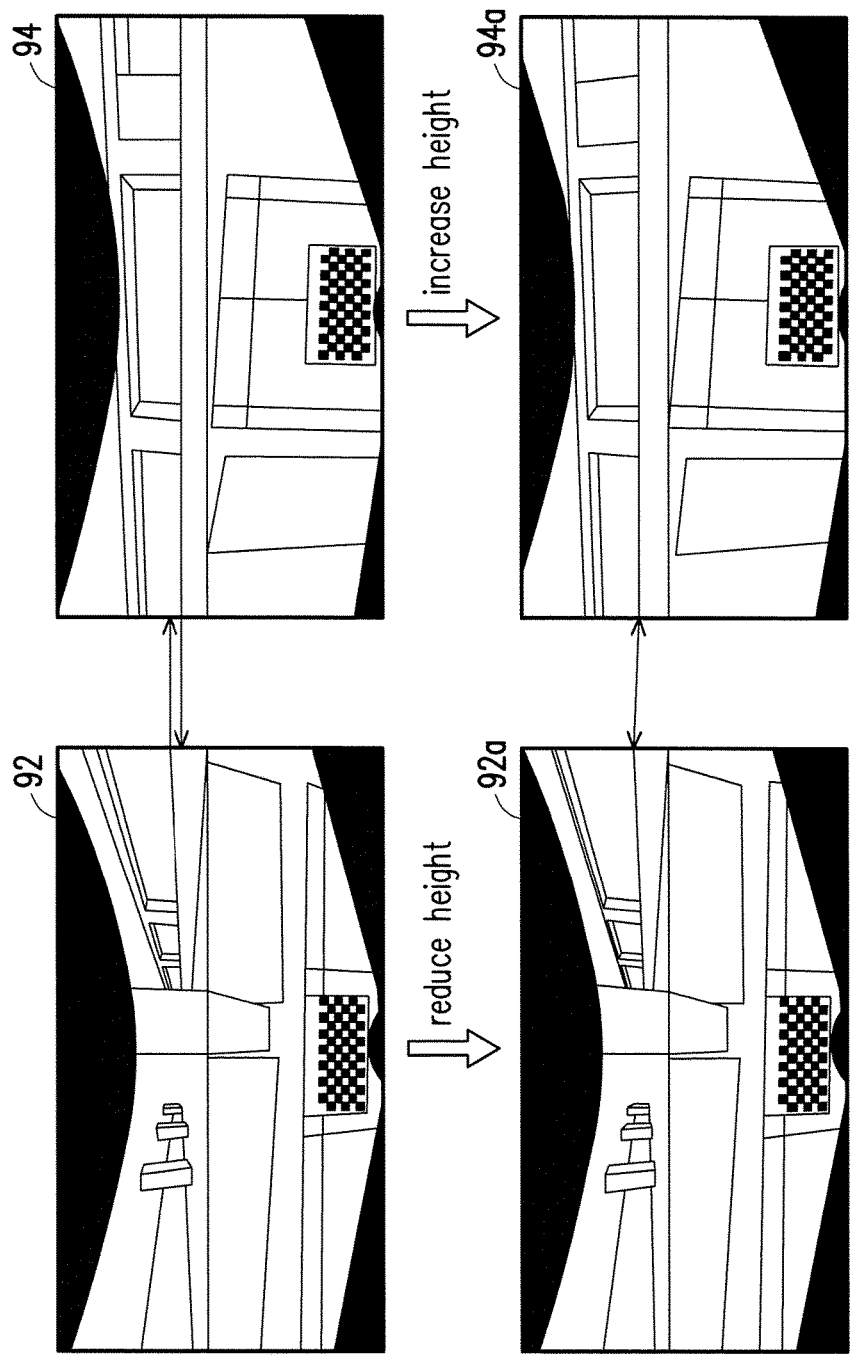
FIG. 9 illustrates an example of adjusting a height of the wall side images according to an embodiment of the invention.

For example, FIG. 9 illustrates an example of adjusting a height of a wall side image according to an embodiment of the invention. Please refer to FIG. 9, an image 92 is a combined image of the left perspective view obtained after performing the fisheye calibration, dividing, and combination on the image captured by the camera disposed on the left of the vehicle, and an image 94 is a combined image of the front perspective view obtained after performing the fisheye calibration, dividing, and combination on the image captured by the camera disposed on the front of the vehicle. It should be known from the top region of the images 92 and 94 that, the walls thereof overlap. However, the wall height of the image 92 (arrow pointing to the right) is evidently higher than the wall height of the image 94 (arrow pointing to the left), and therefore inconsistency of the wall height would exist if the images 92 and 94 were merged directly. Accordingly, by way of the adjustment method of FIG. 8A and FIG. 8B, the present embodiment may reduce the height of the wall side image of the image 92 (equivalent to reduce the wall height) to obtain an adjusted image 92a, and increase the height of the wall side image of the image 94 (equivalent to increase the wall height) to obtain an adjusted image 94a. Since the wall height of the adjusted images 92a and 94a are the same, the wall height of the combination of the images 92a and 94a are consistent as well and the image discontinuation would not happen. Another transformation matrix may be built in the same way as described above according to the adjusted images by using said method, and the transformation matrix may be multiplied by the wall side image of the image of the perspective view, and then the image adjustment may be completed. In another embodiment, the wall side image including a reference object (e.g., a positioning grid or pattern drawn on the wall) may be respectively captured by using said cameras according to said method, and a real wall side image including the same reference object may be captured by using another independent camera disposed in front of the reference object, so as to solve the transformation matrix of the wall side image by the same way as described above.

Finally, the image stitching module 144 stitches the combined images according to a plurality of corresponding features in the combined images of the neighboring perspective views, to generate the synthetic image (S606). Said corresponding feature is, for example, a feature of an object existed in both combined images of two neighboring perspective views. The image stitching module 144 may, for example, rotate four images of the front, rear, left and right sides of the vehicle according to the direction of the vehicle, and then translate and/or resize the combined images according to the object features in the combined images, such that the combined images may be stitched into a single synthetic image.

Figure 10:
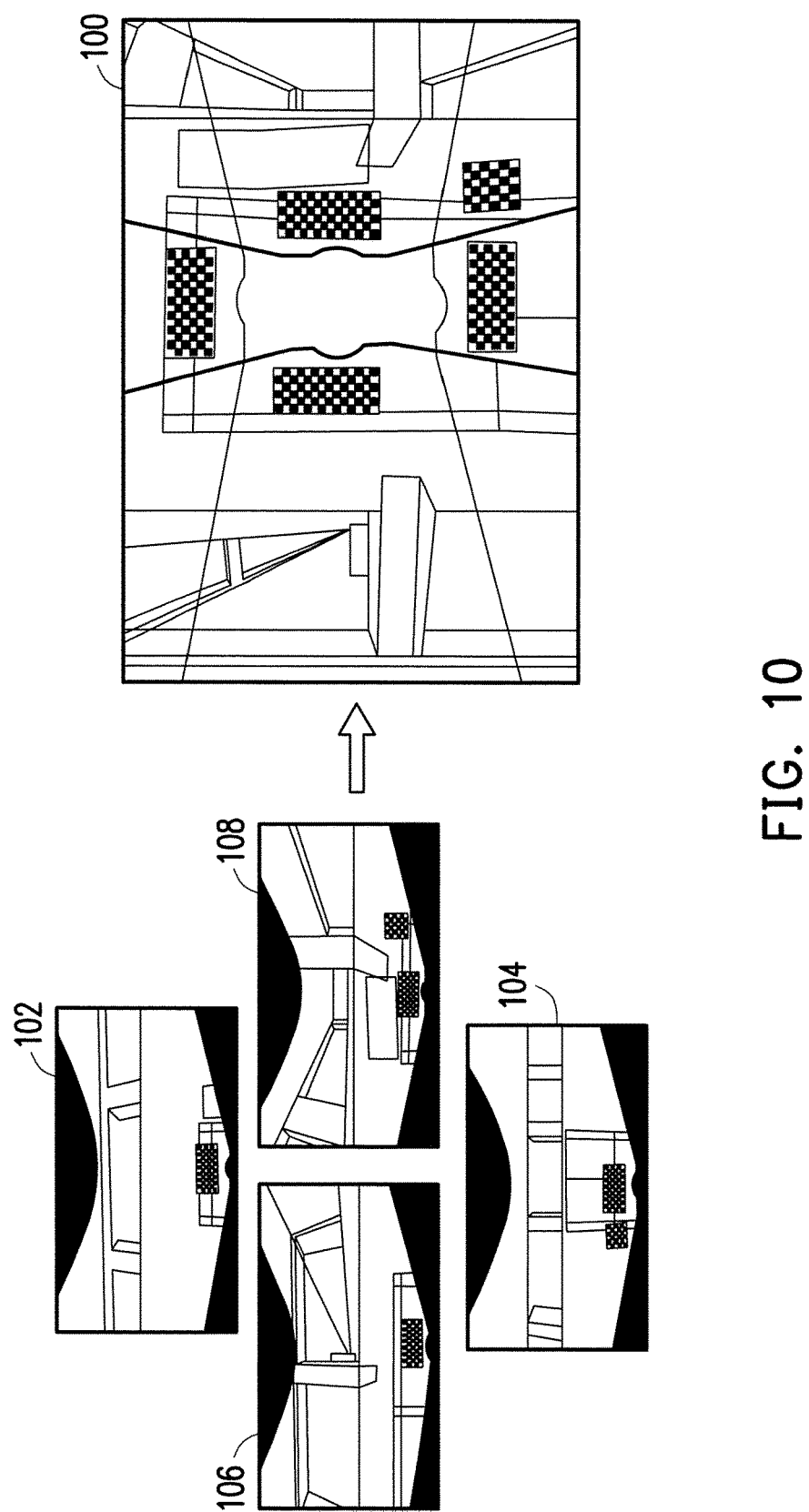
FIG. 10 illustrates an example of stitching the combined images according to an embodiment of the invention.

For example, FIG. 10 illustrates an example of stitching the combined images according to an embodiment of the invention. The images 102, 104, 106, and 108 on the left of FIG. 10 are the combined images of the front, rear, left, and right sides of the vehicle, respectively. When stitching, except for the image 102 of the front side of the vehicle being maintained to the original direction, the image of the left side of the vehicle may be rotated counter-clockwise by 90 degrees, the image of the right side of the vehicle may be rotated clockwise by 90 degrees, and the image of the rear side of the vehicle may be rotated by 180 degrees. Since identical objects such as pillars, parking lot lines, or lamps exist in the images 102, 104, 106, and 108, the apparatus of the present embodiment may stitch the rotated images 102, 104, 106, and 108 according to the locations and sizes of these identical objects, so as to obtain the synthetic image 100 including the floor and scenes surrounding the vehicle. Transformation matrices corresponding to the combined images of the front, rear, left, and right sides of the vehicle may be built by using said method described above, to complete the image stitching.

Back to FIG. 2, since the synthetic image surrounding the vehicle stitched by the image stitching module 144 include the clear wall side images and the clear floor side images of each direction surrounding the vehicle, the processor 16 may perform the 3D modeling module 145, to map and combine the clear synthetic image and the movement trajectory to a 3D model surrounding the vehicle (S208). In which, the 3D modeling module 145 may, for example, first define the height, width, and depth of the 3D model, and then map each pixel of the synthetic image to a corresponding position of the 3D model. In a first embodiment of the 3D modeling module, since the movement trajectory does not appear in the wall side image but only in the floor side image, the movement trajectory may be first combined to the floor side image of the top view to generate the synthetic image surrounding the vehicle and including the movement trajectory, and then the synthetic image including the movement trajectory may be mapped to the 3D model. The movement trajectory may be transformed into a fisheye image (e.g., through an inverse transformation of the said fisheye calibration module) and then be combined with the fisheye image captured by the fisheye lens, or directly combined with the floor side image of the top view generated by the view transformation module and the image stitching module. In a second embodiment of the 3D modeling module, the movement trajectory and the synthetic image are mapped to the 3D model respectively; the 3D modeling module 145 may also map each pixel of the movement trajectory calculated by the trajectory calculation module 141 to a corresponding position in the 3D model, and then combine the movement trajectory mapped to the 3D model and the synthetic image mapped to the 3D model, so that the 3D model not only includes the information of floor and scenes surrounding the vehicle but also includes the information of movement trajectory of the vehicle.

Figure 11:
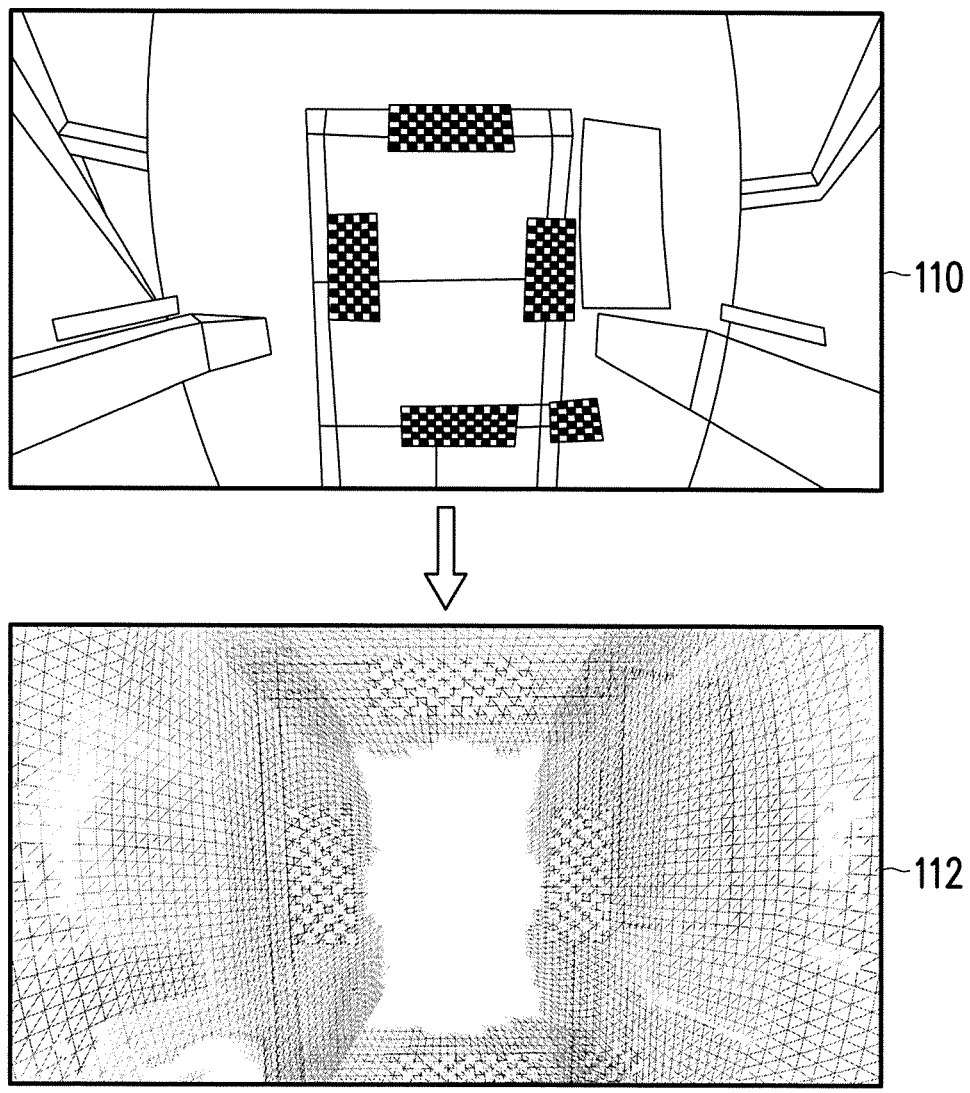
FIG. 11 illustrates an example of building a 3D model according to an embodiment of the invention.

For example, FIG. 11 illustrates an example of building a 3D model according to an embodiment of the invention. An image 110 of FIG. 11 is, for example, the synthetic image surrounding the vehicle (not including the movement trajectory) generated by the method of the aforementioned embodiment. The apparatus of the present embodiment may, for example, first build a 3D model 112 of a surrounding space of the vehicle, so as to map each pixel of the image 110 to a corresponding position of the 3D model 112. It should be noted that, the image 110 of the present embodiment is obtained by processing the images captured by the cameras disposed in the front, rear, left, and right sides on the vehicle. Therefore, when the image 110 is mapped to the 3D model 112, each pixel of the combined images of the images of the perspective views captured by the four cameras disposed on the front, rear, left, and right sides of the vehicle corresponds to one of the pixels of the 3D model. Accordingly, for each pixel in the images captured by said four cameras, the apparatus of the present embodiment may find a corresponding position in the 3D model, so as to establish a correspondence table. As a result, when the apparatus receives the images captured by the four cameras, it may directly transform the pixels of the images into the corresponding positions in the 3D model by looking up the correspondence table, so as to build the 3D model of the space surrounding the vehicle rapidly. In a second embodiment of said 3D modeling module, corresponding positions of the movement trajectory in the 3D model may be similarly found, so as to establish a correspondence table. By looking up the correspondence table, the pixels of the movement trajectory may be directly transformed into the corresponding positions in the 3D model. In the embodiment of FIG. 11, the planes in the 3D model 112 corresponding to the images of the front, rear, left, and right of the vehicle connect to each other by nearly a right angle; however, in other embodiments, the planes may connect to each other by other angles or by curved surfaces.

Finally, the 3D modeling module 145 is executed by the processor 16, to provide the movement image including the movement trajectory having a viewing angle from an upper rear side to a lower front side by using the 3D model when backing up the vehicle (S210). The 3D modeling module 145 may, for example, take a pixel point located on the upper rear side of the vehicle in the 3D model as an eye point, and take a pixel point located in the middle of the 3D model as a sight reference point, to establish a viewing angle transformation matrix, and multiply the viewing angle transformation matrix by each vertex coordinate of the synthetic image and the movement trajectory mapped to the 3D model to obtain the movement image including the movement trajectory having the viewing angle from the upper rear side to the lower front side.

In detail, in one embodiment, the length of the 3D model in z direction (direction of the long-axis of the vehicle) may be set as 4 (+2.0 to −2.0, in arbitrary units; the length on the z direction corresponds to the length of the vehicle), while the width of the vehicle (x direction) and the height of the vehicle (y direction) may be adjusted according to the scale of the synthetic image. Assuming $(x_c, y_c, z_c)$ is a coordinate of the pixel point in the 3D model to which the sight is directed (set as a sight reference point c), $(x_e, y_e, z_e)$ is a coordinate of the pixel point located on the upper rear side of the vehicle in the 3D model (set as an eye point e), and $\vec{u}(u_x, u_y, u_z)$ is a vector pointing from the camera to directly above (i.e., the y direction of the vehicle height). Accordingly, the viewing angle transformation matrix M may be obtained by the following formulas:

$$z = (x_e - x_c, y_e - y_c, z_e - z_c);$$

$$Z = \frac{z}{|z|};$$

$$X = \frac{\vec{u} \times Z}{|\vec{u} \times Z|};$$

$$Y = Z \times X;$$

$$M_1 = \begin{bmatrix} & & & 0 \\ X & Y & Z & 0 \\ & & & 0 \\ 0 & 0 & 0 & 1 \end{bmatrix};$$

$$M_2 = \begin{bmatrix} 1 & 0 & 0 & -x_e \\ 0 & 1 & 0 & -y_e \\ 0 & 0 & 1 & -z_e \\ 0 & 0 & 0 & 1 \end{bmatrix};$$

$$M = M_1 M_2.$$

Figure 12:
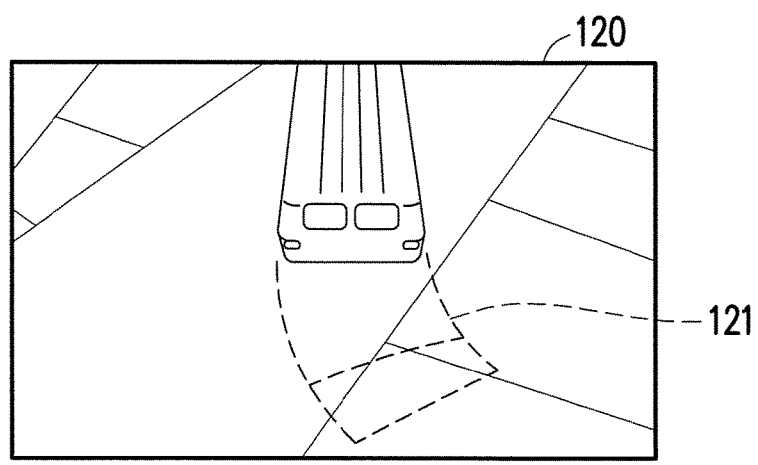
FIG. 12 illustrates an example of providing a movement image including the movement trajectory by using the 3D model according to an embodiment of the invention.

For example, FIG. 12 illustrates an example of providing a movement image including the movement trajectory by using the 3D model according to an embodiment of the invention. The apparatus of the present embodiment may, for example, set the coordinate of the eye point as (0.0, 2.0, 2.0), and set the coordinate of the sight reference point as (0.0, −0.2, 0.7). By substituting said coordinates into said formulas, the viewing angle transformation matrix M may be calculated. By multiplying the viewing angle transformation matrix M by each vertex coordinate of the movement trajectory and the synthetic image mapped to the 3D model, the movement image 120 including the movement trajectory 121 with the viewing angle from the upper rear side to the lower front side of the vehicle as shown in FIG. 12 may be obtained.

It should be noted that, in the aforementioned embodiment, the movement trajectory calculated by the trajectory calculation module 141 is directly mapped to the corresponding positions in the 3D model by the 3D modeling module 145. In another embodiment, a fisheye processing may be performed by the fisheye processing module (not shown) on the movement trajectory calculated by the trajectory calculation module 141 according to the intrinsic parameters and the extrinsic parameters of the cameras, to transform the movement trajectory into a fisheye image, so as to plot the transformed movement trajectory in the image of the perspective view captured by the fisheye lenses. For example, the backing up trajectory may be plotted in the image of the perspective view captured by the fisheye lens on the rear side of the vehicle, and displayed on the display (not shown) of the driver-assistance apparatus 10, so that a user may see the backing up trajectory and the image with a viewing angle from the front to the read side simultaneously.

Figure 13A:
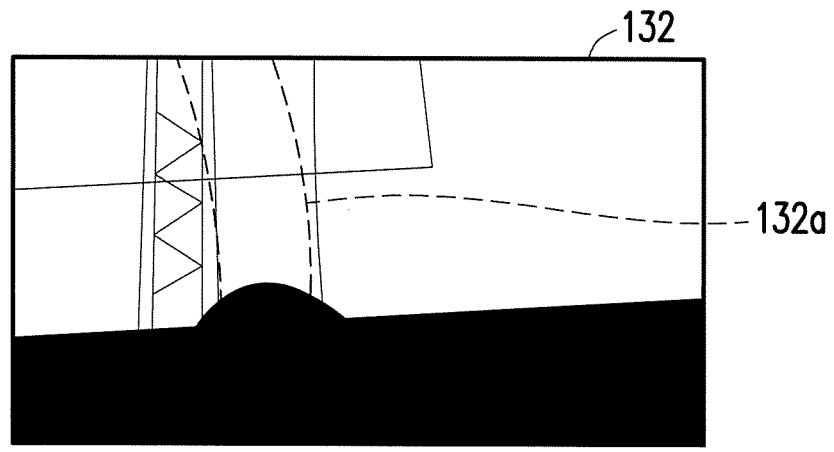
FIG. 13A and FIG. 13B illustrate an example of transforming the movement trajectory from an object space to a fisheye space according to an embodiment of the invention.
Figure 13B:
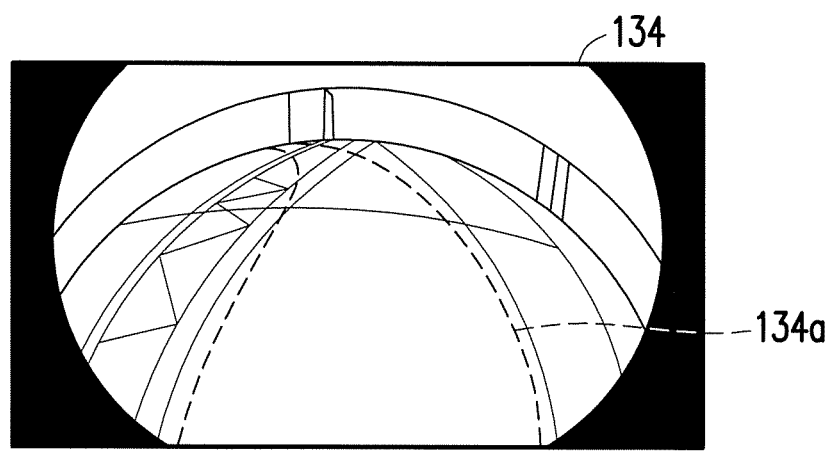

For example, FIG. 13A and FIG. 13B illustrate an example of transforming the movement trajectory into a fisheye image according to an embodiment of the invention. Please refer to FIG. 13A, a movement image 132 is an image of an object space surrounding the vehicle, including a movement trajectory 132a of the wheels in the surroundings of the vehicle when the vehicle moves as calculated by using the method of the aforementioned embodiment. Through the fisheye processing, the movement trajectory 132a may be transformed into a fisheye image, and the transformed movement trajectory 132a may be plotted in the image 134 of the perspective view captured by the fisheye lens.

It should be noted that, in still another embodiment, the image of the perspective view including the movement trajectory may be directly applied in the image processing process shown in FIG. 2. In detail, after transforming such image of the perspective view and the images of the perspective views captured by other cameras to the images of the top view, stitching the transformed images of the top view to provide the synthetic image, and mapping the synthetic image to the 3D model, the obtained 3D model will be similar to the 3D model of the aforementioned embodiment. That is, the obtained 3D model includes not only the information of the floor and the scenes surrounding the vehicle but also the movement trajectory information of the vehicle, which is capable of providing the movement image 120 including the movement trajectory 121 with a viewing angle from the upper rear side to the lower front side of the vehicle similar to that shown in FIG. 12.

In one embodiment, a frequency of calculating and updating the movement trajectory may be lower than a frame rate of the movement image. For example, the frame rate of the images captured by the cameras and the image displayed by the display of the driver-assistance apparatus 10 may both be 30 fps (i.e., refresh 30 times per second). Since the movement trajectory varies slower with time, the updating frequency may be lower, for example, five or ten times per second, so as to save the calculation resources of the processor 16. In another embodiment, if the displayed movement trajectory is required to be highly accurate, the frequency of calculating and updating the movement trajectory may be equal to the frame rate of the movement image. In addition, although the invention uses the movement image including the movement trajectory with a viewing angle from the upper rear side to the lower front side of the vehicle provided when backing up the vehicle for description, the similar method may also be used for providing, by the 3D model, a movement image including the movement trajectory with a viewing angle from the upper front side to the lower rear side of the vehicle when driving forward the vehicle, by taking a pixel point located on the upper front side of the vehicle in the 3D model as an eye point and taking a pixel point located on the lower rear side of the vehicle in the 3D model as a sight reference point. This method may, for example, provide a clear sight of the positions or changes of the scenes surrounding the vehicle when driving forward to park the vehicle. In addition, the invention may either display the movement image including the movement trajectory with a viewing angle from the upper rear side to the lower front side of the vehicle on the display of the driver-assistance apparatus 10 automatically when the vehicle is detected to be backing up, or the movement image may be displayed in response to a manual selection by the user.

In summary, the driver-assistance method and the driver-assistance apparatus of the invention transform the images captured by different views surrounding the vehicle to the images of the top view, and stitch the same to provide a synthetic image capable of showing the scenes surrounding the vehicle clearly. When capturing the images, the invention also calculates the movement trajectory of the wheels in the surroundings of the vehicle when the vehicle moves. By mapping the movement trajectory and the synthetic image to a 3D model of the space surrounding the vehicle, the movement image including the movement trajectory having a viewing angle from the upper rear side to the lower front side of the vehicle may be provided when backing up the vehicle. Accordingly, a user may see the positions or changes of the scenes surrounding the vehicle clearly, so that the driving operation may be adjusted correspondingly.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:

1. A driver-assistance method adapted to an electronic apparatus disposed on a vehicle, wherein the electronic apparatus is coupled to a plurality of cameras disposed on the vehicle, the driver-assistance method comprising:
    calculating a movement trajectory of a plurality of wheels in surroundings of a vehicle when the vehicle moves;
    capturing a plurality of images of a plurality of perspective views surrounding the vehicle by using the cameras, and transforming each of the images from the perspective view to a corresponding image of a top view;
    generating a synthetic image surrounding the vehicle according to the images of the perspective views and the corresponding images of the top view, comprising:
        dividing each of the images of the perspective views into a first floor side image and a first wall side image;
        dividing each of the corresponding images of the top view into a second floor side image and a second wall side image; and
        stitching the second floor side images and the first wall side images to generate the synthetic image surrounding the vehicle;
    mapping and combining the synthetic image and the movement trajectory to a 3D model surrounding the vehicle; and
    providing a movement image comprising the movement trajectory with a viewing angle from an upper rear side to a lower front side by using the 3D model when backing up the vehicle.

2. The method as claimed in claim 1, wherein the step of providing the movement image comprising the movement trajectory with the viewing angle from the upper rear side to the lower front side by using the 3D model when backing the vehicle comprises:
    taking a pixel point located on the upper rear side of the vehicle in the 3D model as an eye point, and taking a pixel point located on the lower front side of the vehicle in the 3D model as a sight reference point, to establish a viewing angle transformation matrix; and
    multiplying the viewing angle transformation matrix by vertex coordinates of the movement trajectory and the synthetic image mapped to the 3D model, to obtain the movement image comprising the movement trajectory with the viewing angle from the upper rear side to the lower front side.

3. The method as claimed in claim 2, wherein after combining the movement trajectory and the corresponding images of the top view to generate the synthetic image surrounding the vehicle comprising the movement trajectory, mapping the synthetic image comprising the movement trajectory to the 3D model to obtain the movement image comprising the movement trajectory.

4. The method as claimed in claim 2, wherein after mapping the movement trajectory and the synthetic image to the 3D model respectively, combining the movement trajectory mapped to the 3D model and the synthetic image mapped to the 3D model to obtain the movement image comprising the movement trajectory.

5. The method as claimed in claim 1, wherein the steps of dividing each of the images of the perspective views into the first floor side image and the first wall side image, and dividing each of the corresponding images of the top view into the second floor side image and the second wall side image comprises:
    finding an interval comprised of at least a preset number of consecutive empty pixels from a column of pixels in each of the corresponding images of the top view after transformation, and dividing each of the images of the perspective views into the first floor side image and the first wall side image and each of the corresponding images of the top view into the second floor side image and the second wall side image according to a height of the interval in the image.

6. The method as claimed in claim 1, wherein the step of calculating the movement trajectory of the wheels in surroundings of the vehicle when the vehicle moves comprises:
    detecting a rotation angle of a steering wheel of the vehicle; and
    looking up a steering angle of the wheels corresponding to the rotation angle of the steering wheel, and estimating the movement trajectory of the vehicle according to the steering angle and a speed of the vehicle.

7. The method as claimed in claim 1, wherein a frequency of calculating and updating the movement trajectory is lower than a frame rate of the movement image.

8. The method as claimed in claim 1, further comprising: providing a movement image comprising the movement trajectory of a viewing angle from an upper front side to a lower rear side by using the 3D model when driving forward the vehicle.

9. The method as claimed in claim 8, wherein the step of providing the movement image comprising the movement trajectory with the viewing angle from the upper front side to the lower rear side by using the 3D model when driving forward the vehicle comprises:
taking a pixel point located on the upper front side of the vehicle in the 3D model as an eye point, and taking a pixel point located on the lower rear side of the vehicle in the 3D model as a sight reference point, to establish a viewing angle transformation matrix; and
multiplying the viewing angle transformation matrix by vertex coordinates of the movement trajectory and the synthetic image mapped to the 3D model, to obtain the movement image comprising the movement trajectory with the viewing angle from the upper front side to the lower rear side.

10. A driver-assistance apparatus, comprising:
a connection device, coupled to a plurality of cameras disposed on a vehicle;
a storage device, storing a plurality of modules; and
a processor, coupled to the connection device and the storage device, loading and executing the modules stored in the storage device, wherein the modules comprise:
a trajectory calculation module, calculating a movement trajectory of a plurality of wheels in surroundings of the vehicle when the vehicle moves;
an image capturing module, capturing a plurality of images of a plurality of perspectives views surrounding the vehicle by using the cameras;
a view transformation module, transforming each of the images of the perspective views to a corresponding image of a top view;
an image dividing module, dividing each of the images of the perspective views into a first floor side image and a first wall side image, and dividing each of the corresponding images of the top view into a second floor side image and a second wall side image;
an image stitching module, generating a synthetic image surrounding the vehicle according to the images of the perspective views and the corresponding images of the top view, wherein the image stitching module stitches the second floor side images and the first wall side images to generate the synthetic image surrounding the vehicle; and
a 3D modeling module, mapping and combining the synthetic image and the movement trajectory to a 3D model surrounding the vehicle, and providing a movement image comprising the movement trajectory with a viewing angle from an upper rear side to a lower front side by using the 3D model when backing up the vehicle.

11. The apparatus as claimed in claim 10, wherein the 3D modeling module comprises taking a pixel point located on the upper rear side of the vehicle in the 3D model as an eye point, and taking a pixel point located on the lower front side of the vehicle in the 3D model as a sight reference point, to establish a viewing angle transformation matrix, and multiplying the viewing angle transformation matrix by vertex coordinates of the movement trajectory and the synthetic image mapped to the 3D model, to obtain the movement image comprising the movement trajectory with the viewing angle from the upper rear side to the lower front side.

12. The apparatus as claimed in claim 11, wherein after combining the movement trajectory and the corresponding images of the top view to generate the synthetic image surrounding the vehicle comprising the movement trajectory, mapping the synthetic image comprising the movement trajectory to the 3D model to obtain the movement image comprising the movement trajectory.

13. The apparatus as claimed in claim 11, wherein after mapping the movement trajectory and the synthetic image to the 3D model respectively, combining the movement trajectory mapped to the 3D model and the synthetic image mapped to the 3D model to obtain the movement image comprising the movement trajectory.

14. The apparatus as claimed in claim 10, wherein the image dividing module comprises finding an interval comprised of at least a preset number of a plurality of consecutive empty pixels from a column of pixels in each of the corresponding images of the top view after transformation, and dividing each of the images of the perspective views into the first floor side image and the first wall side image and each of the corresponding images of the top view into the second floor side image and the second wall side image according to a height of the interval in the image.

15. The apparatus as claimed in claim 10, wherein the trajectory calculation module comprises detecting a rotation angle of a steering wheel of the vehicle, looking up a steering angle of the wheels corresponding to the rotation angle of the steering wheel, and estimating the movement trajectory of the vehicle according to the steering angle and a speed of the vehicle.

16. The apparatus as claimed in claim 10, wherein a frequency of calculating and updating the movement trajectory is lower than a frame rate of the movement image.

17. The apparatus as claimed in claim 10, wherein the 3D modeling module further provides a movement image comprising the movement trajectory of a viewing angle from an upper front side to a lower rear side by using the 3D model when driving forward the vehicle.

18. The apparatus as claimed in claim 17, wherein the 3D modeling module comprises taking a pixel point located on the upper front side of the vehicle in the 3D model as an eye point, and taking a pixel point located on the lower rear side of the vehicle in the 3D model as a sight reference point, to establish a viewing angle transformation matrix, and multiplying the viewing angle transformation matrix by vertex coordinates of the movement trajectory and the synthetic image mapped to the 3D model, to obtain the movement image comprising the movement trajectory with the viewing angle from the upper front side to the lower rear side when driving forward the vehicle.

* * * * *